(12) United States Patent
Lee

(10) Patent No.: US 6,567,553 B1
(45) Date of Patent: May 20, 2003

(54) METHOD FOR GENERATING DIVERSIFIED IMAGE FRAME

(75) Inventor: Tian-Quey Lee, Hsiuchu (TW)

(73) Assignee: Mustek Systems Inc. (TW)

( * ) Notice: Subject to any disclaimer, the term of this patent is extended or adjusted under 35 U.S.C. 154(b) by 0 days.

(21) Appl. No.: 09/321,845

(22) Filed: May 28, 1999

(51) Int. Cl.$^7$ ................................................ G06K 9/36
(52) U.S. Cl. ...................................... 382/232; 348/541
(58) Field of Search ................................. 348/505, 509, 348/530, 531, 537, 541, 543; 382/232, 293, 295; 358/242

(56) References Cited

U.S. PATENT DOCUMENTS

| | | | | |
|---|---|---|---|---|
| 4,595,953 A | * | 6/1986 | Willis | 358/183 |
| 4,679,091 A | * | 7/1987 | Kikuchi et al. | 358/242 |
| 5,404,173 A | * | 4/1995 | Parrish et al. | 348/537 |
| 5,600,379 A | * | 2/1997 | Wagner | 348/497 |
| 5,872,601 A | * | 2/1999 | Seitz | 348/558 |
| 6,292,225 B1 | * | 9/2001 | Champion et al. | 348/511 |

* cited by examiner

Primary Examiner—Yon J. Couso
(74) Attorney, Agent, or Firm—Arent, Fox Kintner Plotkin & Kahn

(57) ABSTRACT

A method is provided for generating a diversified-shaped image frame and fixing a keystone image frame problem. The method includes steps of repeatedly determining a specific pixel frequency of one of the plurality of image signal lines and outputting the one image signal line according to the specific pixel frequency until all of the plurality of image signal lines are outputted. A shape of the image frame is diversified by assigning diversified pixel frequencies to the plurality of image signal lines respectively.

11 Claims, 8 Drawing Sheets

METHOD FOR GENERATING DIVERSIFIED IMAGE FRAME

FIELD OF THE INVENTION

The present invention relates to an image frame generating method, and more particularly to a method for digitally generating a diversified image frame.

BACKGROUND OF THE INVENTION

Conventionally, an image frame is a 3:4 rectangle formed by a plurality of horizontal image signal-lines. The horizontal image signal-lines have a plurality of pixels respectively. For example, the VGA specification provides a image consisting of 480 horizontal image signal-lines. Each horizontal line has 640 pixels. Normally, such a specification is indicated as 640(H)×480(V). An object can be scanned to generate a digital image of the object. The digital image can be outputted through an electrical projector to a display such as a liquid crystal display or a monitor. The electrical projector may be a cathode ray tube (CRT), which generates the scan lines. Referring to FIG. 1, the object is scanned by the optical sensor of the scanner to generate an analog image signal (Step S11). Then, the analog image signal is converted to a digital image signal by an analog to digital converter in Step S12. In Step S12, the digital image signal is stored in a memory unit. Finally, in Step 14, the digital image signal is converted by a digital to analog converter and outputted to the electrical projector.

The electrical project will then generates an image frame as shown in FIG. 2(a). However, sometimes there may be an error in the projecting angle of the electrical projector. Accordingly, a keystone frame as shown in FIG. 2(b) or FIG. 2(c) may be generated because of the different optical path of the scan lines. Referring to FIG. 2(a), the normal image frame will have a rectangular shape wherein the dots A, B, C and D are located at the four corners of the rectangular frame. If the image is projected at an elevated angle, the frame will become a keystone shape as shown in FIG. 2(b). The scan line between upper dots B1 and C1 has a length larger than that of the scan line between lower dots A1 and D1 because the upper dots have optical paths longer than those of the lower dots. Of course, if the image is projected at an angle of depression, the image frame will be a keystone shape as shown in FIG. 2(c). The scan line between the lower dots A2 and D2 will be longer than that between dots B2 and C2 because of a longer optical path.

To avoid the undesired keystone image frame, an optical set is mounted in front of the electrical projecting device to correct the projecting angle of the image. However, to add stitch an optical set is very expensive. Furthermore, the optical set will occupy a certain volume. Therefore, the overall projecting system cannot be scaled down if such an optical set is mounted. Another method for correcting the keystone image frame is needed.

Furthermore, the conventional method for correcting the keystone frame can only perform a symmetric correction. Accordingly, a method which can not only correct the keystone frame but also diversify the outline of the image frame is desirable.

It is then attempt by the present invention to solve the abovementioned problem.

SUMMARY OF THE INVENTION

An object of the present invention is to provide a method for generating a diversified-shaped image frame.

Another object of the present invention is to provide a method for correcting a keystone projecting-image frame without needing of an expensive optical set.

A further object of the present invention is to reduce the size of an electrical projecting device.

The present invention provides a method for generating a diversified-shaped image frame formed by a plurality of image signal lines. The method includes steps of determining a specific pixel frequency of one of the plurality of image signal lines, and outputting said one image signal line according to said specific pixel frequency. The steps are repeated until all of said plurality of image signal lines are outputted.

The pixel frequency is preferably a dot clock frequency of said one image signal line. The dot clock frequency is preferably generated by a phase lock loop (PLL) technique and a frequency divider.

The plurality of image signal lines are preferably horizontal image signal lines.

The method preferably further comprising steps of adding a plurality of black pixels to the two ends of the image signal line when outputting image signal lines. When outputting the image signal line and the black pixels added beside the image signal line, a logic control technique is preferably used for switching between the black pixels and the image signal line.

The image frame may include n image signal lines. $I_{3k-2}$, $I_{3k-1}$ and $I_{3k}$ are the pixels added beside one end of the $k^{th}$ one of the image signal lines, the $k^{th}$ one of the image signal lines and the pixels added beside the other end of the $k^{th}$ one image signal lines respectively. Steps for determining the specific pixel frequency may include calculating the total pixel number of $(I_{3k-2}+I_{3k-1}+I_{3k})$ and calculating and outputting the specific pixel frequency, wherein the specific pixel frequency is equal to the total pixel number of $(I_{3k-2}+I_{3k-1}+I_{3k})$ divided by a duty cycle of a horizontal image-synchronous-signal of the kth image signal line, wherein n and k are positive integers and $1 \leq k \leq n$.

The plurality of image-signal lines are outputted by an electrical projecting device with an projecting angle $\theta$. Accordingly, the method for calculating the total pixel number may include inputting a value of the projecting angle $\theta$, inputting values of geometrical variance coefficients $\delta k1$ and $\delta k2$, calculating the pixel numbers of $I_{3k-2}$ and $I_{3k}$, inputting the pixel number of $I_{3k-1}$, and summing up the pixel numbers of $I_{3k-2}$, $I_{3k-1}$ and $I_{3k}$ for obtaining the total pixel number. The pixel numbers of $I_{3k-2}$ may be equal to $(n-k+1) \times \tan \theta + \delta k1$, and the pixel numbers of $I_{3k}$ may be equal to $(n-k+1) \times \tan \theta + \delta k2$.

There may have another method for calculating $I_{3k-2}$ and $I_{3k}$. In this case, $I_{3k-2} = n \times \tan \theta - \text{mod}(k/D)$, and $I_{3k} = n \times \tan \theta - \text{mod}(k/D)$, wherein $D = \text{mod}(\tan \theta)$.

Once the specific pixel frequency has been calculated, the image signal line may be outputted through the following steps: generating a horizontal projecting-image synchronous-orientation signal of the $k^{th}$ image signal line according to the horizontal image-synchronous-signal of the $k^{th}$ image signal line, outputting $I_{3k-2}$ according to the horizontal projecting-image synchronous-orientation signal of the $k^{th}$ image signal line, the specific pixel frequency and the pixel number of $I_{3k-2}$, finishing outputting $I_{3k-2}$, and outputting $I_{3k-1}$ according to the specific pixel frequency and the pixel number of $I_{3k-1}$, finishing outputting $I_{3k-1}$, and outputting $I_{3k}$ according to the specific pixel frequency and the pixel number of $I_{3k}$, and finishing outputting $I_{3k}$. Preferably, an ending signal is provided for finishing outputting $I_{3k-2}$ to output $I_{3k-1}$, an ending signal is provided for finishing outputting $I_{3k-1}$ to output $I_{3k}$, and an ending signal is provided for finishing outputting $I_{3k}$ to output the next image signal line.

The present invention may best be understood through the following description with reference to the accompanying drawings, in which:

DETAILED DESCRIPTION OF THE PREFERRED EMBODIMENTS

Figure 3:
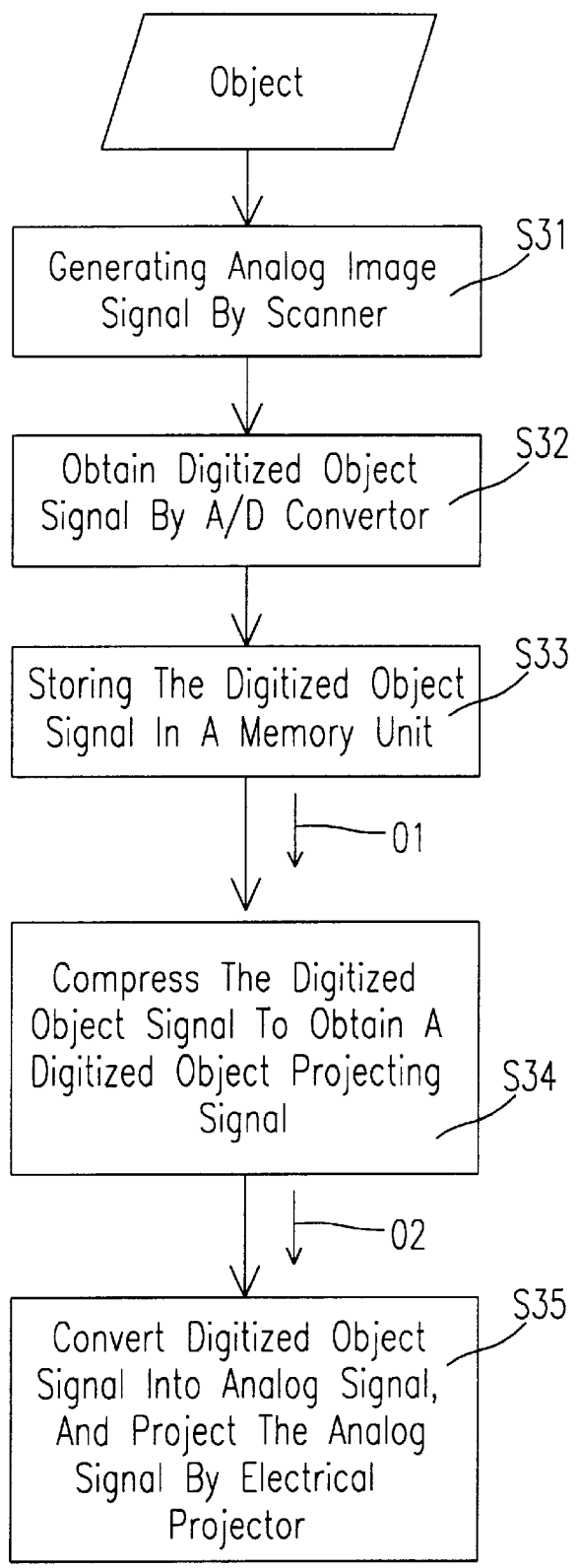
FIG. 3 is a flow chart showing a preferred embodiment of an image generating process according to the present invention.

FIG. 3 is a flowchart of the method of the present invention. The method includes steps of S31) scanning an object to obtain an analog image signal;

S32) proceeding an analog/digital conversion for obtaining a digital image signal 01 of the object;

S33) storing the digital image signal 01 in a memory unit;

S34) reading the digital image signal 01 to be processed by a digital image processing method for generating a digital projected image signal 02; and S35) converting the digital projected image signal 02 into an analog signal, and outputting the analog signal by an electrical projecting device.

Figure 1:
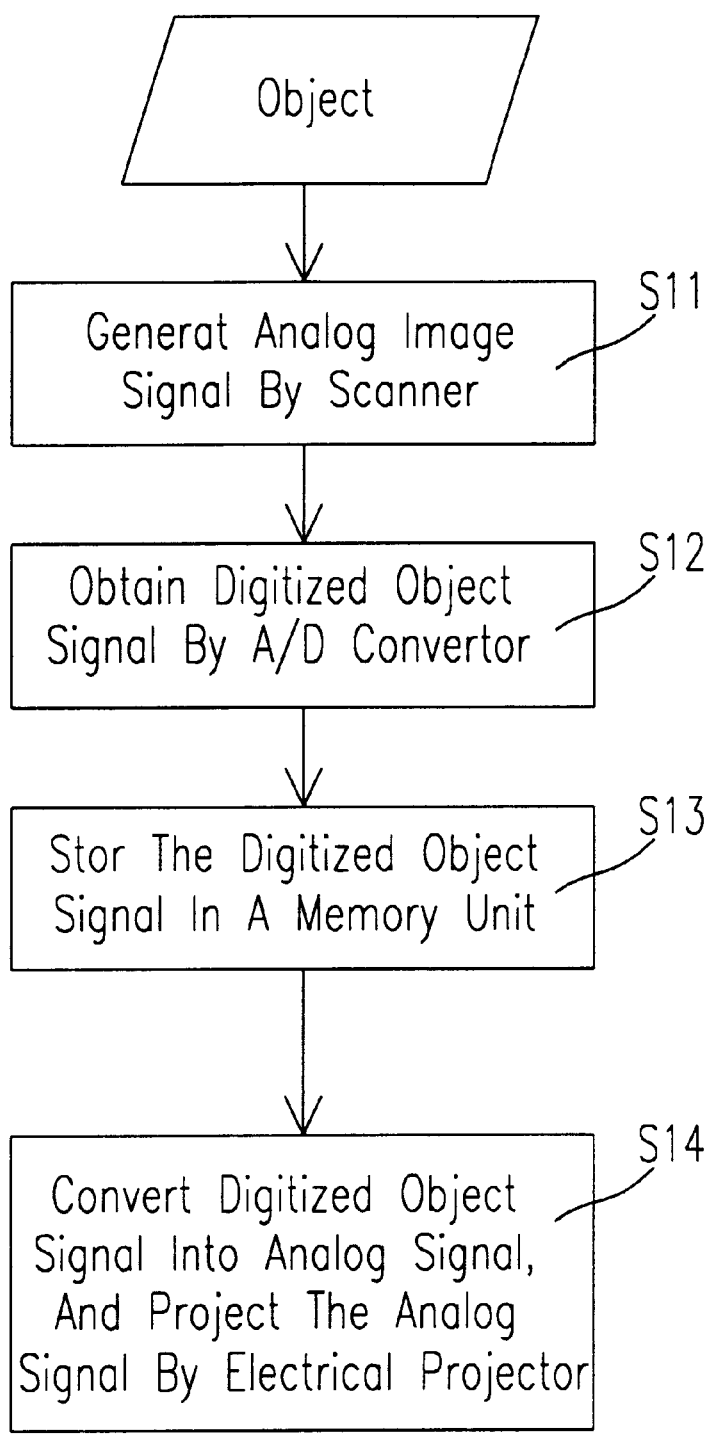
FIG. 1 is a flow chart showing a process for generating an image frame.
Figure 2A:
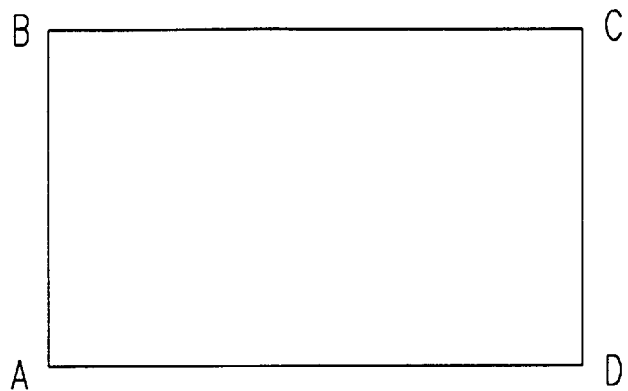
FIGS. 2(a)–2(c) indicates image frames projected at different projecting angles respectively.
Figure 2B:
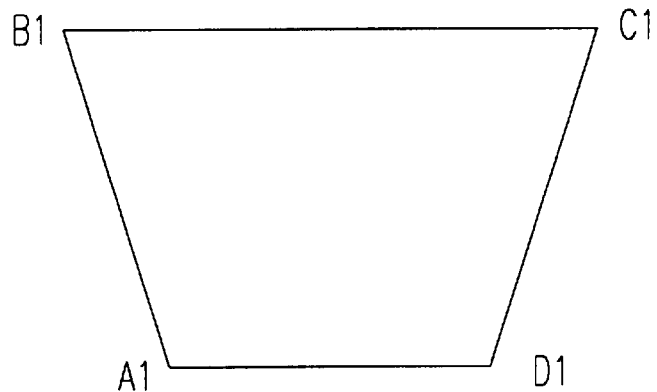
Figure 2C:
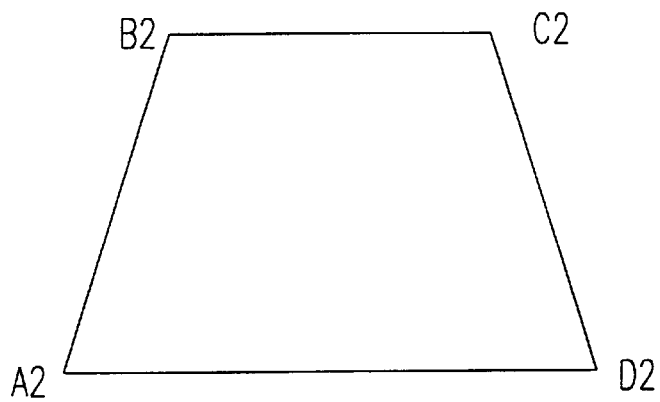

Obviously, the difference between the steps shown in FIGS. 1 and 3 is Step 34. The conventional method does not proceed Step 34, so only a 3:4 rectangular frame is generated. Furthermore, an expensive optical set is needed to correct the keystone frame. The present invention controls and processes the digitized image signal 01 in Step 34. The generated image frame will be diversified, and the keystone frame can be corrected without using an extra optical set.

According to the present invention, a diversified image frame can be obtained by assigning different dot-clock frequencies to different horizontal image signal-lines. In other words, the horizontal image signal-lines are respectively "compressed" as desired so that an image frame with desired outline is obtained. Furthermore, a suitable number of black pixels can be added beside the two ends of the compressed horizontal image signal-line. Of course, a digital logic control technique is also provided to switch the black-pixel-signal and the image signal. The black pixels can also be replaced by other colors according to the requirement of the application.

Figure 4:
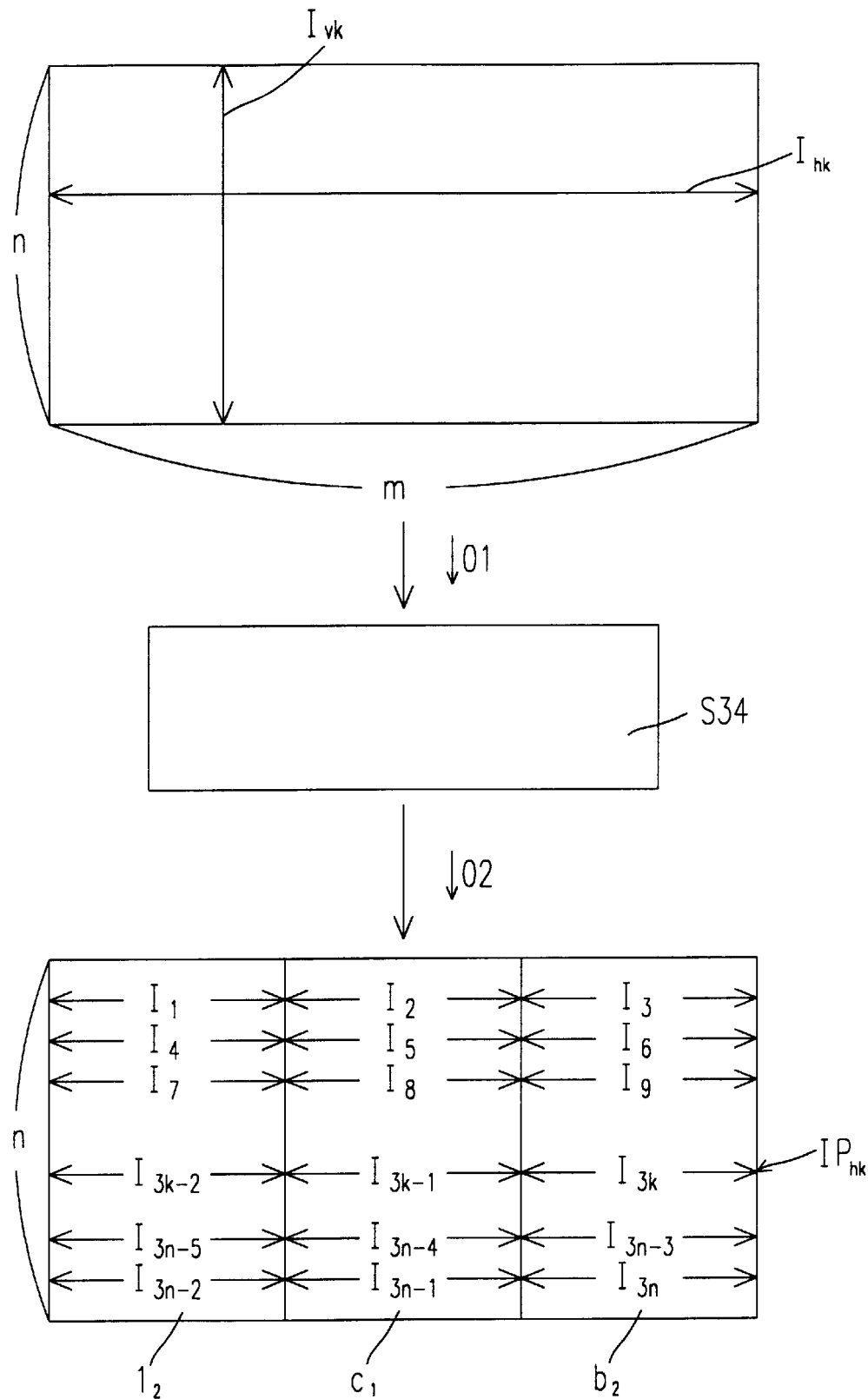
FIG. 4 illustrates that a digital object image signal is processed by Step S34 shown in FIG. 3 to obtain a projected image signal.

FIG. 4 illustrates that the digitized image signal 01 is processed by Step 34 shown in FIG. 3 to obtain the projected image signal 02. The digitized image signal 01 is stored in a memory unit. The image frame composed of the digitized image signal 01 includes n horizontal image signal lines and m vertical-signal lines (according to the VGA specification, n=480 and m=640, and according to the SVGA specification, n=600 and m=800). Of course, both n and m are positive integers. In FIG. 4, $I_{hk}$ represents the "$k^{th}$" horizontal image signal line of the frame. Furthermore, $I_{vk}$ is the "$k^{th}$" vertical image signal line of the frame.

In Step 34, the horizontal image signal lines are compressed. Different image lines may have different compressed ratios. The compression may be achieved by increasing the frequency of the dot clock of the horizontal image signal line. Furthermore, black pixels are compensated to the two ends of the compressed horizontal image signal line. Accordingly, as shown in FIG. 4, the projected image signal 02 may have three portions. For example, the first horizontal image signal line has three portions, i.e. $I_1$, $I_2$ and $I_3$. $I_2$ is the image line compressed from the first horizontal image signal line $IP_{h1}$ of the image signal 01. $I_1$ and $I_3$ are the black pixels that are added beside $I_2$. Other horizontal image signal lines of the projected image signal are similar to the first horizontal image signal line $IP_{h1}$. The "$k^{th}$" horizontal image signal line $IP_{hk}$ includes three portions: $I_{3k-2}$, $I_{3k-1}$ and $I_{3k}$, where k is a positive integer and $1 \leq k \leq n$. The projected image signal 02 includes three portions: the first black-pixel portion b1, the image frame portion c1, and the second black-pixel portion b2. The image frame portion c1 is composed of $I_2$, $I_5$, $I_8$, ... $I_{3n-1}$ compressed from $I_{h1}$, $I_{h2}$, $_{h3}$, ... $I_{hn}$ respectively. The diversified shape of the image frame portion c1 can be obtained by assigning different compressing ratios to the horizontal image signal lines respectively. The method for compressing the horizontal image signal lines $I_{h1}$, $I_{h2}$, $I_{h3}$, ... $I_{hn}$ is to change the dot clock frequency. Basically, a pixel is outputted according to a dot clock. The horizontal image signal line $I_{3k-1}$ has a pixel number identical to that of the horizontal image signal line $I_{hk}$. However, the $k^{th}$ horizontal image signal line $IP_{hk}$ of the projected image signal 02 has a pixel frequency (dot clock frequency) equal to the total pixel number of $(I_{3k-2}+I_{3k-1}I_{3k})$ divided by the duty cycle of the synchronous signal of the $k^{th}$ horizontal image signal line. The electrical projector will output the $k^{th}$ horizontal image signal line $IP_{hk}$ according to its pixel frequency mentioned above. Obviously, if the horizontal image signal line $I_{hk}$ is directly outputted by the electrical projector without being processed by Step 34, a conventional projected image signal line will be obtained. The pixel frequency of $IP_{hk}$ will be greater than that of a conventional projected image signal line if the pixel number of $(I_{3k-2}+I_{3k})$ is greater than zero. Since the number of black pixels $(I_{3k-2}+I_{3k})$ can be controlled as desired, a diversified-shaped image frame can thus be obtained.

The required dot clock frequency of each horizontal image signal line can be generated by rising a phase lock loop (PLL) technique in cooperating of a frequency divider. Switching the black pixels and the compressed image signal can be performed by a microprocessor or any other digital logic control technique. Of course, an ending signal can be provided at the ends of $I_{3k-2}$, $I_{3k-1}$ and $I_{3k}$ respectively.

Figure 5:
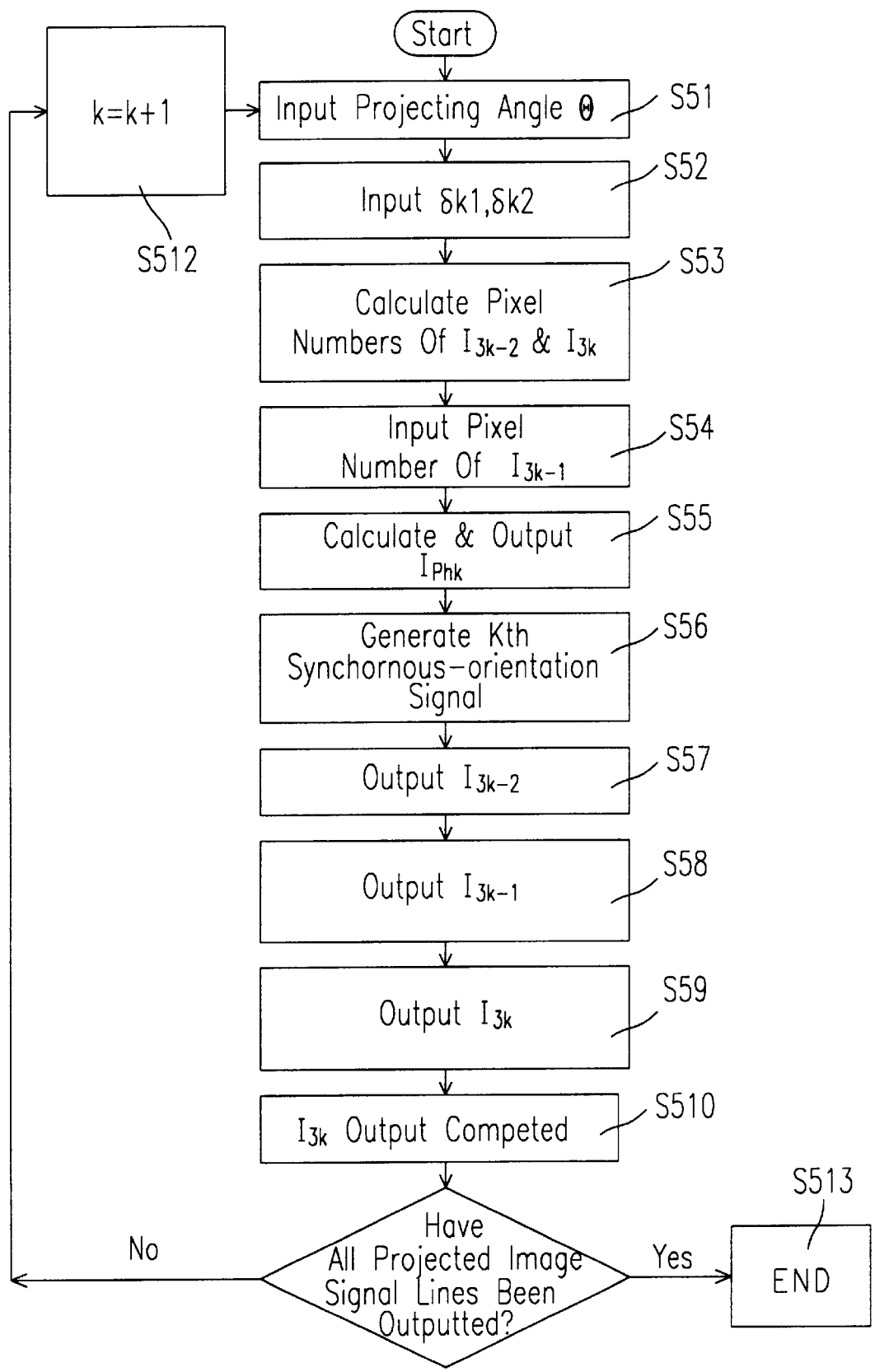
FIG. 5 is a flowchart of a preferred embodiment of a digital image-frame generation method according to the present invention.

Please refer to FIG. 5, which is a flowchart of a preferred embodiment of the present invention. The method include steps of:

Step S51: inputting a value of an projecting angle θ;

Step S52: inputting the geometrical variance coefficients δk1 and δk2;

Step S53: calculating the pixel numbers of $I_{3k-2}$ and $I_{3k}$ according to the projecting angle $\theta$ and the geometrical variance coefficients $\delta k1$ and $\delta k2$, wherein the pixel numbers of $I_{3k-2}$ and $I_{3k}$ are $(n-k+1) \times \tan \theta + \delta k1$ and $(n-k+1) \times \tan \theta + \delta k2$ respectively;

Step S54: inputting the pixel number of $I_{3k-1}$;

Step S55: calculating and outputting the pixel frequency of the $k^{th}$ horizontal image signal line $IP_{hk}$, wherein the pixel frequency of $IP_{hk}$ is equal to the pixel number of $(I_{3k-2}+I_{3k-1}+I_{3k})$ divided by the duty cycle of the $k^{th}$ horizontal projected image synchronous signal;

Step S56: generating the synchronous-orientation signal of the $k^{th}$ horizontally projected image signal according to the signal of the $k^{th}$ horizontal image synchronous signal;

Step S57: outputting $I_{3k-2}$ according to the synchronous-orientation signal of the $k^{th}$ horizontally projected image signal, the pixel frequency of the $k^{th}$ horizontally projected image signal and the pixel number of $I_{3k-2}$;

Step S58: finishing outputting $I_{3k-2}$, and outputting $I_{3k-1}$ according to the pixel frequency of the $k^{th}$ horizontal projected image and the pixel number of $I_{3k-1}$;

Step S59: finishing outputting $I_{3k-1}$, and outputting $I_{3k}$ according to the pixel frequency of the $k^{th}$ horizontal projected image signal and the pixel number of $I_{3k}$;

Step S510: finishing outputting $I_{3k}$;

Step S511: identifying that whether all the n horizontal projected image signal lines have been outputted or not;

Step S512: setting k=k+1 and repeating Step S51 to output the next horizontal image signal line if the output is not completed; and Step S513: when all the n horizontal projected image signal lines have been outputted, terminating the process and a diversified-shaped image frame is thus obtained.

In the above-mentioned embodiment, the pixel number of the $k^{th}$ horizontally projected image signal $IP_{hk}$ is calculated before $IP_{hk}$ is generated. The pixel number of $I_{3k-1}$ is fixed. So, when the pixel number of $(I_{3k-2}+I_{3k})$ is grater than zero, $I_{3k-1}$ is compressed since more pixels are outputted in one image signal line $IP_{hk}$. The pixel numbers of $I_{3k-2}$ and $I_{3k}$ can be obtained by the following formulas: $I_{3k-2}=(n-k+1) \times \tan \theta + \delta k1$, and $I_{3k}=(n-k+1) \times \tan \theta + \delta k2$. Of course, the numbers of the pixels of $I_{3k-2}$ and $I_{3k}$ can be controlled by adjusting the values of the projecting angle $\theta$ and the geometrical variance coefficients $\delta k1$ and $\delta k2$. Since the pixel number of $I_{3k-1}$ is fixed, it is observed that the compressed ratio of $I_{3k-1}$ is determined by the total pixel number of $IP_{hk}$. That is to say, the compressed ratio can be determined by the inputted parameter. Accordingly, a diversified-shaped image frame can be obtained by controlling the values of input parameters.

When the pixel numbers of $I_{3k-2}$ and $I_{3k-1}$ have been calculated through the above-mentioned formulas, the total pixel number of $IP_{hk}$ can be obtained by summing tip the numbers of the pixels of $I_{3k-2}$, $I_{3k-1}$, and $I_{3k}$. Then, the pixel frequency (dot frequency) of the $k^{th}$ horizontal image signal can be obtained by dividing the total pixel number of $IP_{hk}$ by the duty cycle of the synchronous signal of the $k^{th}$ horizontal image. $I_{3k-2}$, $I_{3k-1}$ and $I_{3k}$ are then outputted sequentially according to the obtained pixel frequency. Since the pixel frequencies of the horizontal image lines can be different as desired, a diversified-shaped frame can be obtained. The values of the projecting angle $\theta$ and the geometrical variance coefficient $\delta k1$ and $\delta k2$ of each of the horizontal image signal lines can be pre-determined and stored in a table installed within a memory device.

Figure 6:
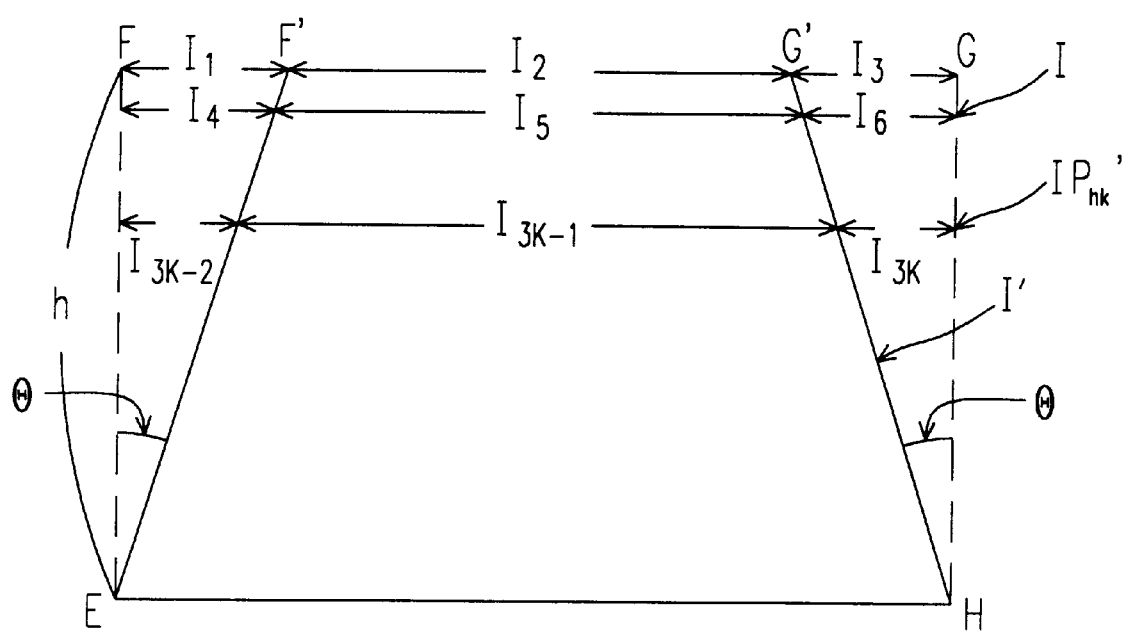
FIG. 6 illustrates an image frame generated by a preferred method according to the present image that can correct a keystone projection.

The method of the present invention is especially useful for correcting a keystone image frame caused by optical-path difference. As shown in FIG. 6, a horizontally projected image signal line, which has a longer projecting optical path, may have a highest compressed ratio. The compressed ratio (original image/compressed image) is decreased as the length of the optical path is decreased. The projected image frame shown in FIG. 6 is used for correcting an image frame which is projected at an elevated angle. The image signal line on the top of the frame has a highest compressed ratio. However, since it also has the longest projecting optical path, the compressed image-signal line will thus have a normal length on the projecting object. Accordingly, the keystone problem is fixed.

As shown in FIG. 6, the image frame EF'G'H is a compressed image I' which includes n horizontal image signal lines $I_2, I_5, \ldots I_{3n-1}$. $I_2$ is on the top of the image frame and has a highest compressed ratio. Since the image frame is projected with a elevated angle $\theta$, it is observed that $I_2$ has the longest projecting optical path. The last image signal line, $I_{3n-1}$, has the lowest compressed ratio and projecting optical path. The compressed ratio is proportional to the projecting optical path. Accordingly, when the projected image is projected on the screen, a normal rectangle image frame EFGH of the image I can be obtained.

Figure 7:
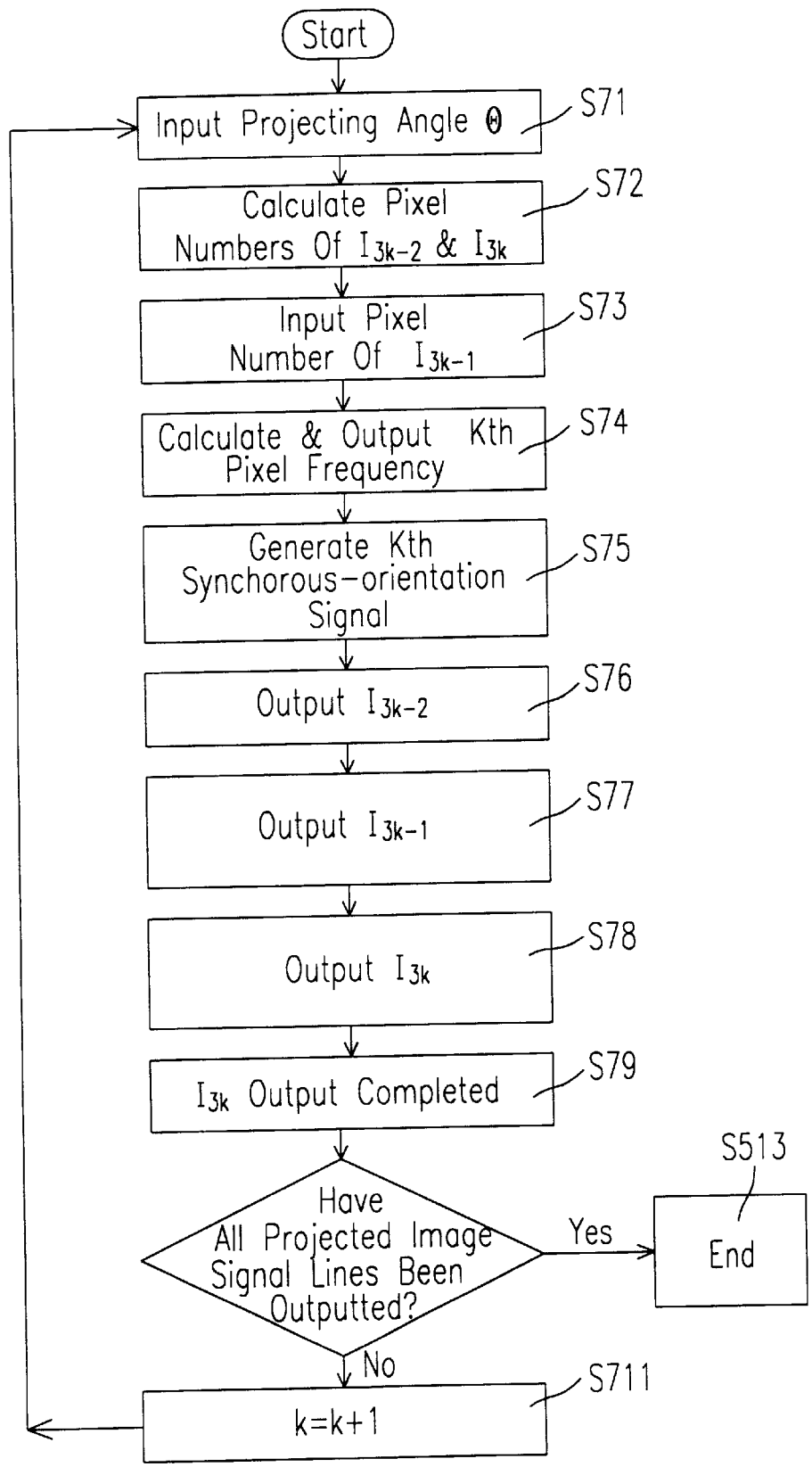
FIG. 7 is a flowchart of another preferred embodiment of a digital image-frame generation method according to the present invention.

The image frame shown in FIG. 6 can be obtained through the following steps, which is also illustrated in FIG. 7:

Step S71: inputting the projecting angle $\theta$;

Step S72: calculating the pixel numbers of $I_{3k-2}$ and $I_{3k}$ according to the inputted projecting angle $\theta$, wherein the pixel numbers of $I_{3k-2}$ and $I_{3k}$ are $(n-k+1) \times \tan \theta + \delta k1$ and $(n-k+1) \times \tan \theta + \delta k2$ respectively;

Step S73: inputting the pixel number of $I_{3k-1}$;

Step S74: computing and outputting the pixel frequency of the $k^{th}$ projected image signal line $IP_{hk}$, wherein the pixel frequency of the $k^{th}$ projected image signal line $IP_{hk}$=the total pixel number of $(I_{3k-2}+I_{3k-1}+I_{3k})$ divided by the duty cycle of the of the $k^{th}$ horizontal image-synchronous signal;

Step S75: generating the synchronous-orienitation signal of the $k^{th}$ horizontal projected image according to the signal of the $k^{th}$ horizontal image-synchronous signal;

Step S76: outputting $I_{3k-2}$ according to the synchronous-orientation signal of the kth horizontal projected image, the pixel frequency of the $k^{th}$ horizontal projected image signal, and the pixel number of $I_{3k-2}$, where the time period needed for outputting $I_{3k-2}$=[1/(the pixel frequency of the kth horizontal projected image signal)]×(the pixel number of $I_{3k-2}$);

Step S77: finishing outputting $I_{3k-2}$, and outputting $I_{3k-1}$ according to the pixel frequency of the $k^{th}$ horizontal projected image and the pixel number of $I_{3k-1}$, where the time period needed for outputting $I_{3k-1}$=[1/(the pixel frequency of the $k^{th}$ horizontal projected image signal)]×(the pixel number of $I_{3k-1}$);

Step S78: finishing outputting $I_{3k-1}$, and outputting $I_{3k}$ according to the pixel frequency of the $k^{th}$ horizontal projected image signal and the pixel number of $I_{3k}$, where the time period needed for outputting $I_{3k}$=[1/(the pixel frequency of the $k^{th}$ horizontal projected image signal)]×(the pixel number of $I_{3k}$);

Step S79: finishing outputting $I_{3k}$;

Step S710: identifying whether all the n horizontal projected image signal lines have been outputted or not;

Step S711: setting k=k+1 and repeating Step S71 to output the next horizontal image signal line if the output is not completed; and Step S712: when all the n horizontal projected image signal lines have been outputted, terminating the process and a diversified-shaped image frame is thus obtained.

Figure 8:
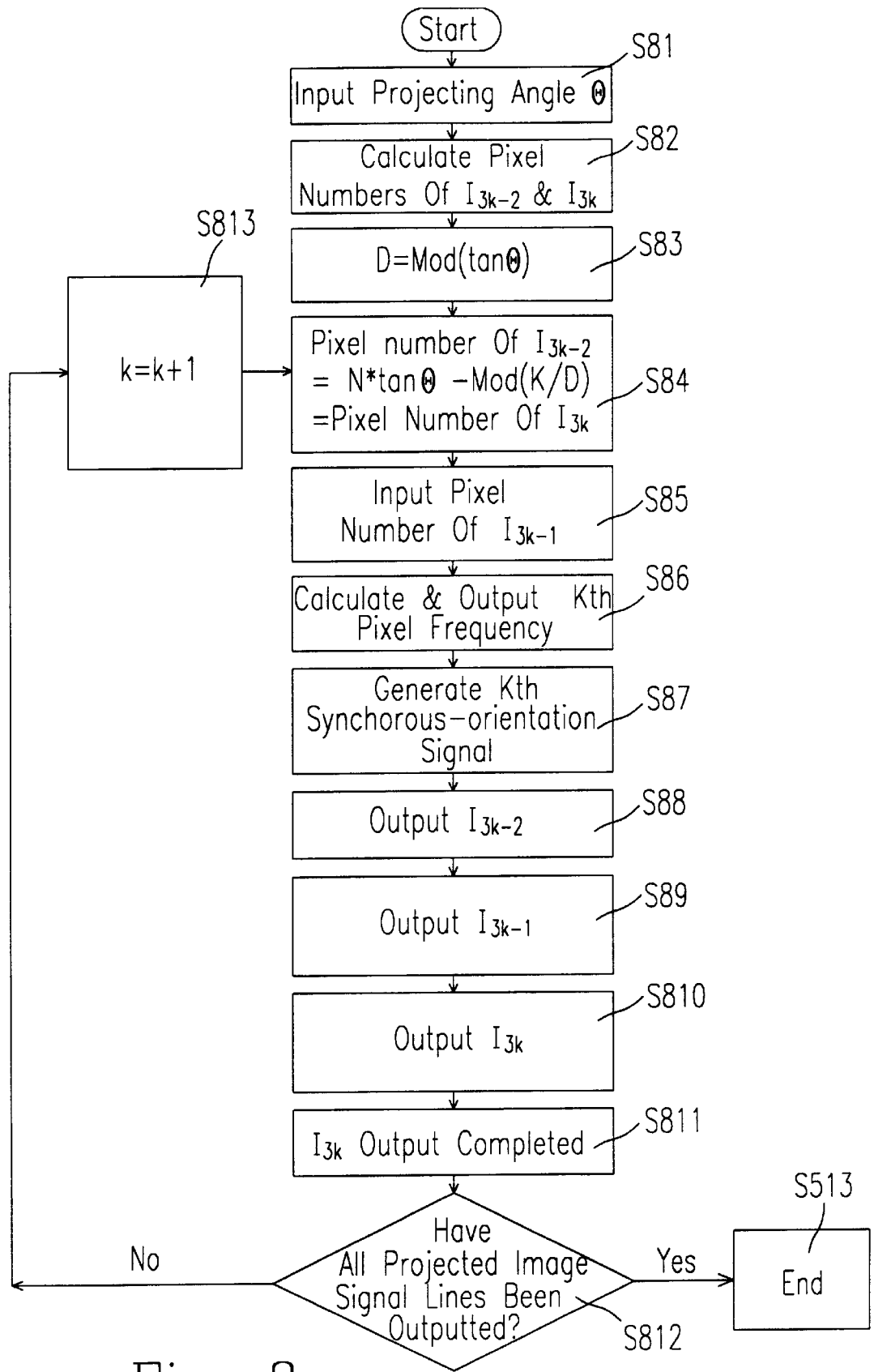
FIG. 8 is a flowchart of a further preferred embodiment of a digital image-frame generation method according to the present invention.

Another preferred embodiment of the method for obtaining the image frame shown in FIG. 6 is illustrated in FIG. 8. This method includes steps of:

Step S81: inputting the projecting angle θ;

Step S82: calculating the pixel numbers of $I_{3k-2}$ and $I_{3k}$ according to tile inputted projecting angle θ, wherein the pixel numbers of $I_{3k-2}$ and $I_{3k}$ are both n×tan θ;

Step S83: calculating the value of tan θ to obtaining a pixel number decreasing coefficient D from the integer portion of tan θ;

Step S84: stepwise subtracting the pixel numbers of $I_{3k-2}$ and $I_{3k}$ respectively by one pixel per D projected image signal lines;

Step S85: inputting the pixel number of $I_{3k-1}$;

Step S86: computing and outputting the pixel frequency of the $k^{th}$ projected image signal line $IP_{hk}$, wherein the pixel frequency of the kth projected image signal line $IP_{hk}$=the total pixel number of $(I_{3k-2}+I_{3k-1}+I_{3k})$ divided by the duty cycle of the $k^{th}$ horizontal image-synchronous signal;

Step S87: generating the synchronous-orientation signal of the $k^{th}$ horizontal projected image signal according to the signal of the $k^{th}$ horizontal image-synchronous signal;

Step S88: outputting $I_{3k-2}$ according to the synchronous-orientation signal of the $k^{th}$ horizontal projected image signal, the pixel frequency of the $k^{th}$ horizontal projected image signal and the pixel number of $I_{3k-2}$, where the time period needed for outputting $I_{3k-2}$=[1/(the pixel frequency of the $k^{th}$ horizontal projected image signal)]×(the pixel number of $I_{3k-2}$);

Step S89: finishing outputting $I_{3k-2}$, and outputting $I_{3k-1}$ according to the pixel frequency of the $k^{th}$ horizontal projected image signal and the pixel number of $I_{3k-1}$, where the time period needed for outputting the image $I_{3k-1}$=[1/(the pixel frequency of the kth horizontal projected image signal)]×(the pixel number of $I_{3k-1}$);

Step S810: finishing outputting $I_{3k-1}$, and outputting $I_{3k}$ according to the pixel frequency of the $k^{th}$ horizontal projected image signal and the pixel number of $I_{3k}$, wherein the time period needed for outputting $I_{3k}$=[1/(the pixel frequency of the $k^{th}$ horizontal projected image signal)]×(the pixel number of $I_{3k}$);

Step S811: finishing outputting $I_{3k}$;

Step S812: identifying whether all the n horizontal projected image signal lines have been outputted or not;

Step S813: setting k=k+1 and repeating Step S81 to output the next horizontal image signal line if the output is not completed; and Step S814: when all the n horizontal projected image signal lines have been outputted, terminating the process and a diversified-shaped image frame is thus obtained.

To sum up, the present invention provides a method for diversifying the image frame so that a wide-ranging application may be developed. Furthermore, the present invention solves the keystone-frame problem and doesn't need the expensive optical device. Accordingly, the present invention is valuable for the industry.

While the invention has been described in terms of what are presently considered to be the most practical and preferred embodiments, it is to be understood that the invention needs not be limited to the disclosed embodiment. On the contrary, it is intended to cover various modifications and similar arrangements included within the spirit and scope of the appended claims which are to be accorded with the broadest interpretation so as to encompass all such modifications and similar structures.

What is claimed is:

1. A method for generating a diversified image frame formed by a plurality of image signal lines, comprising steps of:

(a) determining a specific pixel frequency of one of said plurality of image signal lines;

(b) adding a plurality of black pixels to the two ends of said one image signal line and outputting said one image signal line according to said specific pixel frequency, wherein when outputting said image signal line and said black pixels added beside said image signal line, a logic control technique is used for alternately switching said black pixels and said image signal line; and (c) repeating said steps (a) and (b) for outputting another one of said plurality of image signal lines until all of said plurality of image signal lines are outputted, wherein diversified pixel frequencies for said plurality of image signal lines are respectively determined in said step (a) to generate said diversified-shaped image frame, said image frame includes n image signal lines, and $I_{3k-2}$, $I_{3k-1}$, and $I_{3k}$ are adjacent pixels on the $k^{th}$ one of said image signal lines, wherein said step (a) includes steps of:

(a1) calculating the total pixel number of $(I_{3k-2}+I_{3k-1}+I_{3k})$; and (a2) calculating and outputting said specific pixel frequency, wherein said specific pixel frequency is said total pixel number of $(I_{3k-2}+I_{3k-1}+I_{3k})$ divided by a duty cycle of a horizontal image-synchronous-signal of said $k^{th}$ image signal line, wherein n and k are positive integers and $1 \leq k \leq n$.

2. A method according to claim 1 wherein said pixel frequency is a dot clock frequency of said one image signal line.

3. A method according to claim 2 wherein said dot clock frequency is generated by a phase lock loop (PLL) technique and a frequency divider.

4. A method according to claim 1 wherein said plurality of image signal lines are horizontal image signal lines.

5. A method according to claim 1 wherein said plurality of image-signal lines are outputted by an electrical projecting device with an projecting angle θ.

6. A method according to claim 5 wherein said step (a1) includes steps of (a11) inputting a value of said projecting angle θ;

(a12) inputting values of geometrical variance coefficients δk1 and δk2;

(a13) calculating said pixel numbers of $I_{3k-2}$ and $I_{3k}$, wherein
said pixel numbers of $I_{3k-2}$=(n−k+1)×tan θ+δk1, and
said pixel numbers of $I_{3k}$=(n−k+1)×tan θ+δk2.

(a14) inputting the pixel number of $I_{3k-1}$; and (a15) summing said pixel numbers of $I_{3k-2}$, $I_{3k-1}$ and $I_{3k}$ for obtaining said total pixel number.

7. A method according to claim 5 wherein said step (a1) includes steps of:

(a11) inputting a value of said projecting angle θ;

(a12) inputting values of geometrical variance coefficients δk1 and δk2;

(a13) calculating said pixel numbers of $I_{3k-2}$ and $I_{3k}$, wherein
said pixel numbers of $I_{3k-2}$=n×tan θ−mod(k/D), and
said pixel numbers of $I_{3k}$=n×tan θ−mod(k/D), wherein D=mod(tan θ);

(a14) inputting the pixel number of $I_{3k-1}$; and (a15) summing said pixel numbers of $I_{3k-2}$, $I_{3k-1}$ and $I_{3k}$ for obtaining said total pixel number.

8. A method according to claim 7 wherein said step (b) includes steps of:

(b1) generating a horizontal projecting-image synchronous-orientation signal of said $k^{th}$ image signal line according to said horizontal image-synchronous-signal of said $k^{th}$ image signal line;

(b2) outputting $I_{3k-2}$ according to said horizontal projecting-image synchronous-orientation signal of said $k^{th}$ image signal line, said specific pixel frequency and the pixel number of $I_{3k-2}$;

(b3) finishing outputting $I_{3k-2}$, and outputting $I_{3k-1}$ according to said specific pixel frequency and the pixel number of $I_{3k-1}$;

(b4) finishing outputting $I_{3k-1}$, and outputting $I_{3k}$ according to said specific pixel frequency and the pixel number of $I_{3k}$; and (b5) finishing outputting $I_{3k}$.

9. A method according to claim 8 wherein an ending signal is provided for finishing outputting $I_{3k-2}$ to output $I_{3k-1}$.

10. A method according to claim 8 wherein an ending signal is provided for finishing outputting $I_{3k-1}$ to output $I_{3k}$.

11. A method according to claim 8 wherein an ending signal is provided for finishing outputting $I_{3k}$ to output the next image signal line.

* * * * *